US007048556B2

(12) United States Patent  
Stanton et al.

(10) Patent No.: US 7,048,556 B2  
(45) Date of Patent: May 23, 2006

(54) CONNECTOR COVER FOR COMMUNICATION DEVICE

(75) Inventors: Stephen M. Stanton, Chandler, AZ (US); James L. Isbell, Phoenix, AZ (US); Matthew R. Michieli, Gilbert, AZ (US); John R. Bohlen, Sunrise, FL (US); Aaron R. Allen, Pembroke Pines, FL (US); David I. Blatt, Margate, FL (US); Sam V. Hosseini, SW Ranches, FL (US); Dav H. Karl, Ft. Lauderdale, FL (US); Eduardo Nogueiras, Miramar, FL (US); Peter D. Iezzi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/728,336

(22) Filed: Dec. 4, 2003

(65) Prior Publication Data

US 2005/0124191 A1 Jun. 9, 2005

(51) Int. Cl.  
*H01R 13/44* (2006.01)

(52) U.S. Cl. ...................... 439/135; 439/136
(58) Field of Classification Search ........ 439/135–136, 439/142, 148–149, 892–893; 361/684  
See application file for complete search history.

(56) References Cited

U.S. PATENT DOCUMENTS

| 4,609,246 | A | * | 9/1986 | Ustin et al. ............... 439/590 |
| 4,635,225 | A | * | 1/1987 | Imai et al. ..................... 365/1 |
| 4,731,032 | A | * | 3/1988 | Noorily ...................... 439/136 |
| 5,547,388 | A | * | 8/1996 | Hill ............................ 439/135 |
| 5,554,822 | A | * | 9/1996 | Gilpin et al. ............... 174/52.3 |
| 5,574,625 | A | * | 11/1996 | Ohgami et al. ............. 361/684 |
| 5,808,861 | A | * | 9/1998 | Nakajima et al. ........... 361/680 |
| 6,406,321 | B1 | * | 6/2002 | Hayashi et al. ............. 439/374 |
| 6,419,128 | B1 |   | 7/2002 | Barriac et al. ........... 222/383.3 |

FOREIGN PATENT DOCUMENTS

EP 0352347 A1 * 7/1988

* cited by examiner

*Primary Examiner*—Michael C. Zarroli (57) ABSTRACT

An apparatus for protecting an accessory connector (12) on a communication device (10). The communication device can include an opening (14) for providing access to the connector. The apparatus can be a cover (16) attached in a tethered relation to the communication device. A portion of the cover can be flexible so as to allow a user to selectively move the cover between a first position and a second position. In the first position, at the cover can substantially close the opening such that the connector is substantially protected from the infiltration of solid particles and the gross intrusion of liquids. In the second position, the cover can be held away from the connector such that substantially unimpeded access to the connector is permitted. The cover and communication device can have various associated features to ensure that the cover is retained in the first and second positions.

14 Claims, 5 Drawing Sheets

CONNECTOR COVER FOR COMMUNICATION DEVICE

CROSS-REFERENCE TO RELATED APPLICATIONS

Not applicable.

FIELD OF THE INVENTION

The invention relates in general to communication devices and, more particularly, to apparatus and methods for protecting and/or accessing one or more accessory connectors on a communication device.

BACKGROUND OF THE INVENTION

Communication devices can provide one or more connectors so as to allow the device to interface with another device. For instance, a communication device, such as a cellular telephone, can include a connector that permits interaction between the device and a personal digital assistant. Normal use, handling and storage can expose such communication devices to various external substances and contaminants. For example, when placed upon a table or inside of a bag, the device can come into contact with solid particles such as dirt, crumbs, dust, lint and other substances. Over time, these solid substances can accumulate, especially in and around the connector as this area can be difficult to clean. Eventually, the accumulations can clog the connector or otherwise interfere with the intended operation of the connector.

In addition to solid matter, another concern is the intrusion of liquid substances into and around the connector. Liquid intrusion can occur, for instance, when a user operates or subjects a communication device to wet or moist conditions including rain, fog and snow. When a liquid penetrates into or around the connector, the connector as well as the communication device can become damaged and performance of these components can be adversely affected.

When a communication device fails to function properly, regardless of the specific nature of the substance infiltrating the connector, the user may return the device or, if available, request warranty repair service. Such repairs can be time consuming and costly, and can mar the reputation of a manufacturer or service provider. Existing covers for connectors or connector ports might provide some protection from intrusion of liquids or solid materials, but typically fail to provide easy accessibility to the connectors or ports lying behind or underneath such covers. In other words, existing covers (particularly covers tethered to a product housing) impede access to the connector ports even when the covers are in an open or removed position. Furthermore, many existing covers fail to provide tactile feedback or other feedback confirming that the cover is in a properly closed or sealed position.

SUMMARY OF THE INVENTION

Thus, one embodiment according to the present invention provides an apparatus that can protect an accessory connector on a communication device from external contaminants and allows substantially unimpeded access to an accessory connector when desired. Yet another embodiment provides an apparatus that is selectively movable between an open access position and a closed protected position. Another aspect provides for a system for retaining the apparatus in each of these positions. The apparatus can substantially permanently remain associated with the communication device while protecting and accessing a connector on a communication device.

In yet another embodiment of the invention, a communication assembly can include a communication device, such as a cellular telephone, having at least one connector and an opening providing access to the at least one connector. The communication assembly can further include a cover tethered to the communication device. At least a portion of the cover can be flexible such that the cover is selectively movable between a first position and a second position.

In the first position, at least a portion of the cover substantially closes the opening, thereby substantially protecting the connector from the infiltration of solid particles and the gross intrusion of liquids. The cover can be held in the first position at least by engagement between at least a portion of the cover and at least portion of the communication device. In one embodiment, the engagement can be an interference fit. In another embodiment, the engagement can be between at least one projection provided on the cover and at least one cavity in the opening. When the cover is in the second position, substantially unimpeded access to the connector is permitted. In addition, while in the second position, the cover can be substantially prevented from moving back toward the first position.

In another, an accessory cover for a communication device can include a flap and at least two attachment legs. The at least two attachment legs can be substantially parallel to each other. Each leg has a proximal end and a distal end. The proximal end of each leg is flexibly connected to the flap and the distal end of each leg can be adapted for connection to the communication device. At least a portion of each attachment leg can be bendable. Thus, the flap is movable between at least a first position and a second position.

In the first position, the flap can be disposed substantially 90 degrees relative to the attachment legs; in the second position, the flap can be disposed substantially in the same plane relative to the attachment legs. The cover can provide one of a tactile signal or an audible signal when the cover is moved between the first and second positions.

As noted, the distal end of each leg is adapted for connection to the communication device. For example, the distal end of each attachment leg can include one or more slots. The slots can lockingly receive a corresponding protrusion on the communication device. Alternatively, the distal end of each attachment leg can include one or more protrusions that can be lockingly received in a corresponding passage in the communication device.

The flap can include at least one notch for receiving at least a portion of the at least one attachment leg when the cover is moved. In one embodiment, the flap can be substantially flat. In another embodiment, the flap can be substantially rectangular. The flap can include at least one edge portion. The edge portion can include at least one protrusion that can lockingly engage a portion of the communication device so as to retain the communication device in the first position. In one design, the flap can include at least one notch, which lockingly engages a respective protrusion on the communication device so as to retain the communication device in the first position. In another design, at least one projection can extend substantially transversely from the flap. The at least one projection can be shaped to interface with a connector. For instance, the at least one projection can be shaped to substantially surroundingly receive a connector.

In still other respects, another embodiment illustrates a method of accessing and protecting a connector on a communications device. In accordance with the method, a communication device is provided. The device includes at least one connector, an opening providing access to the at least one connector, and a cover tethered to the communication device. The cover is movable between at least a first locked position and a second locked position. In the first position, at least a portion of the cover engages at least a portion of the communication device so as to substantially close the opening.

When the cover is in the first position, the method involves disengaging the cover from the communication device, and moving the cover toward the second locked position until the cover locks in place. The cover can be substantially prevented from traveling toward the first position such that substantially unimpeded access to the connector is provided.

When the cover is locked in the second position, an accessory connector or plug can be adapted to be received within the communication device connector. Then, the accessory connector and the communication device connector can be operationally joined. Alternatively, when the cover is in the second position, the cover can be moved toward the first locked position until at least a portion of the cover lockingly engages at least a portion of the communication device. As a result, the cover is substantially prevented from traveling toward the second position.

DETAILED DESCRIPTION OF EMBODIMENTS OF THE INVENTION

Embodiments according to aspects of the invention are shown in FIGS. 1–8, which illustrate a communication assembly having one or more features for protecting an accessory connector on a communication device and a method of accessing and/or protecting a connector on a communications device, but the present invention is not limited to the illustrated structure or application. Further, the following detailed description is intended only as exemplary.

Aspects of the invention can be applied to a communication device 10 or any other suitable device. The communication device 10 can be a transceiver that can transmit and/or receive RF communications data. For example, the communication device 10 can be a mobile transceiver, such as a mobile radio, cellular telephone or any other mobile communication device. The communication device 10 can support duplex or half duplex communications services. Further, the communication device 10 can be of almost any construction. For example, the communication device 10 can comprise a single body or it can be an assembly of two or more parts. The communication device 10 can also be just a transmitting device or just a receiving device or any appliance having a connector port.

The communication device 10 can provide one or more connectors 12. The connector 12 can be almost any kind of connector, and aspects of the invention are not limited to any particular type of connector. For example, the connector 12 can be provided for the purpose of charging the device 10. Further, the connector 12 can be a port for connecting earphones, a microphone or a headset to the device. In addition, the connector 12 can be a data port for uploading data from and downloading data to, for example, a computer or personal data assistant. Moreover, the connector 12 can permit unidirectional communication as well as bidirectional communication between the communication device 10 and another device (not shown). The connector 12 may require a direct connection to the other device, or the connector 12 can facilitate indirect connections such as wireless communication or other remote interfacing.

A communication device 10 according to one embodiment can provide an opening 14 so that the connector 12 can be accessed. The opening 14 can be any of a variety of shapes and sizes and can depend, at least in part, on the conformation of the connector 12 as well as how the connector 12 is disposed with respect to the rest of the communication device 10. For example, the connector 12 can be recessed within the opening 14 or protrude beyond the opening 14. The opening 14 can be formed by cutouts in the one or more pieces making up the communication device 10.

Another embodiment relates to a communication assembly having an apparatus for protecting an accessory connector 12 on a communication device 10. In general, the apparatus comprises a cover 16. Preferably, the cover 16 is substantially permanently attached to the communication device 10 so that it cannot be completely separated from the communication device 10, thereby reducing concerns of losing or misplacing the cover 16. For example, at least a portion of the cover 16 can be tethered or anchored to the communication device 10.

Figure 1:
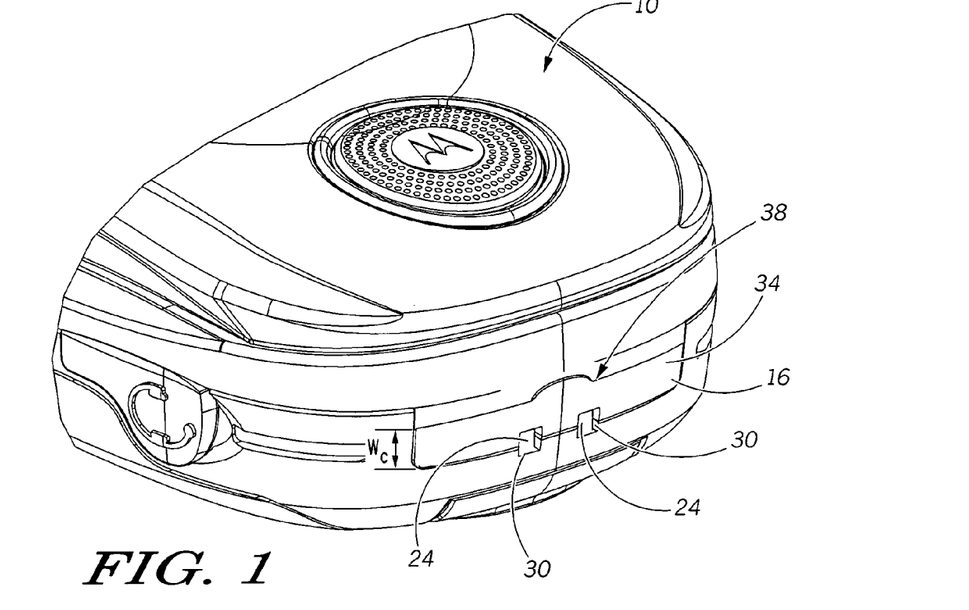
FIG. 1 is an isometric view of a communication assembly according to an embodiment of the invention, showing the cover in a first position.

At least a portion of the cover 16 can be flexible such that the cover 16 can be selectively movable between a first position and a second position. It should be noted that the terms first and second are used as a matter of convenience and are not intended to limit the scope of the invention. In the first position, at least a portion of the cover 16 can substantially close the opening 14 so that the connector 12 is substantially protected from the infiltration of solid particles and the gross intrusion of liquids, an example of which is shown in FIG. 1. The level of protection can vary as desired. For example, the cover 16 can substantially close the opening 14 so that only relatively larger solids are prevented from coming into contact with the connector 12.

Alternatively, the cover 16 can prevent the entry of smaller or finer particles. Similarly, the degree to which the connector 12 is sealed from liquids can vary, ranging from preventing only gross intrusion of liquids to providing a hermetic seal.

Figure 2:
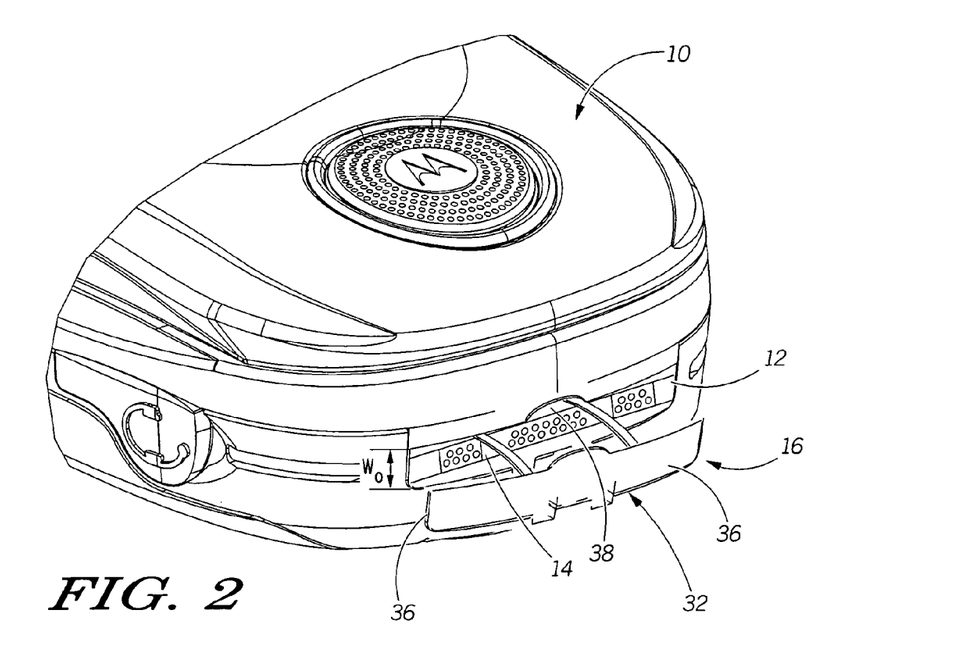
FIG. 2 is an isometric view of the communication assembly of FIG. 1, showing the cover in a second position.

While the cover 16 can provide significant advantages in preventing undesired substances from contacting the connector 12, the cover 16 can become a nuisance if, in the second position, a user must manually hold the cover out of the way in order to access the connector 12. Thus, in the second position, substantially unimpeded access to the connector 12 is permitted, an example of which is shown in FIG. 2. Substantially unimpeded access means that user can substantially laterally bring an accessory connector (not shown) into operational engagement with the connector 12 on the communication device 10 without obstruction or very minimal obstruction from the cover 16. Such obstruction can occur when the cover 16, out of its own resilience, seeks to return to the first position. Thus, the cover 16 can be configured so that when the cover 16 is in the second position, the cover 16 is held substantially in place such that the cover is substantially prevented from moving back toward the first position. In one embodiment, at least a portion of the cover 16 can made of a material that is sufficiently flexible and that can substantially lock the cover 16 in the second position when it is moved into the second position. The force of the locked second position can be overcome by a user manually exerting a force on the cover 16 in the general direction of the first position.

Likewise, various features can be provided on the cover 16 and/or the communication device 10 so that the cover 16 can be held in the first position. In one embodiment, the cover 16 can be held in the first position at least by engagement between at least a portion of the cover 16 and at least a portion of the communication device 10. The engagement can be, for example, an interference fit. As shown in FIGS. 1 and 2, the width of the opening Wo can be sized slightly smaller than the width of the cover Wc so that an interference condition occurs when the cover 16 is moved into the second position. Another type of engagement can occur between at least one projection 40 provided on the cover 16 (FIG. 3) and at least one cavity (not shown) in the opening 14. The cavity can be an opening or slot extending through the cover 16. The cavity can also be a recess, groove or channel in at least a portion of the cover 16. Regardless of the specific manner of engagement, the cover 16 is prevented, at least out of its own resilience, from traveling substantially back toward the second position. Further, a user should be allowed to overcome the force of the engagement by prying the cover 16 with a finger or a tool.

Figure 3:
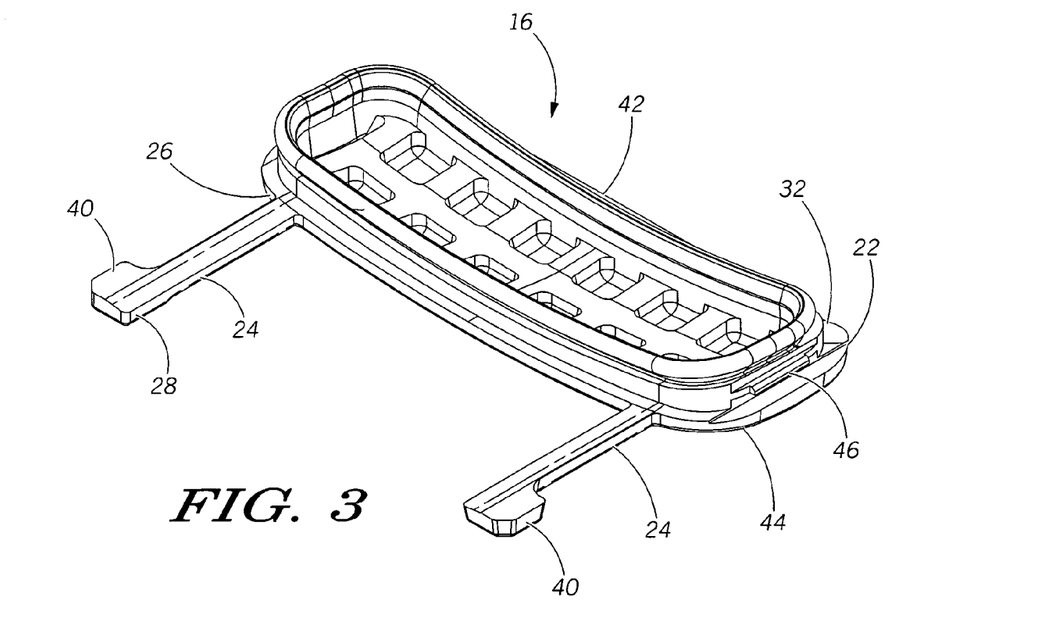
FIG. 3 is an isometric view of an accessory cover according to another embodiment of the invention, showing the inward side of the cover in the second position.
Figure 4:
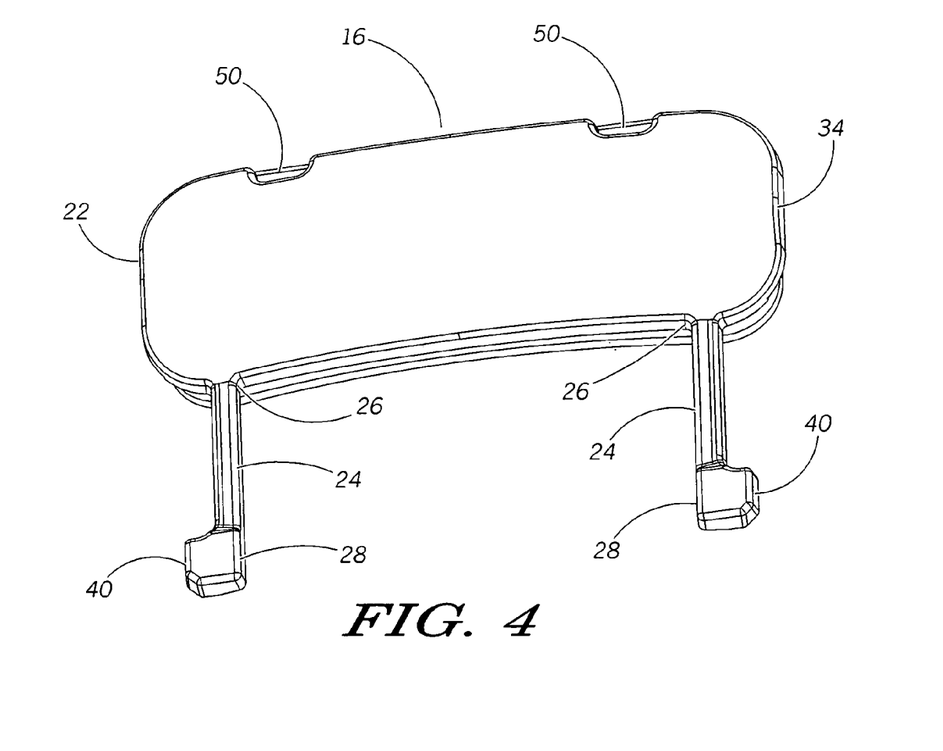
FIG. 4 is an isometric view of the accessory cover of FIG. 3, showing the outward side of the cover in the second position.

A cover 16 according to aspects of the invention can have numerous forms and can include various associated features. Referring to FIGS. 3 and 4, in one general configuration, the cover 16 can include a flap 22 and at least one attachment legs 24. The attachment legs 24 can have almost any relationship with respect to each other and, in one embodiment, the attachment legs 24 can be substantially parallel to each other. Each attachment leg 24 can have a proximal end 26 and a distal end 28. The proximal end 26 of each leg 24 can be flexibly connected to the flap 22. The distal end 28 of each leg 24 can be adapted for connection to the communication device 10. At least a portion of the attachment leg 24 can be bendable; thus, the flap 22 can be moved between at least a first position and a second position. In the first position, the flap 22 can disposed substantially 90 degrees relative to the attachment legs 24.

Examples of specific embodiments of covers according to aspects of the invention are shown in FIGS. 1–9. One embodiment is shown in FIGS. 1–2 and another embodiment is shown in FIGS. 3–9. Various features associated with each embodiment will be discussed in turn below.

With respect to the embodiment shown in FIGS. 1–2, the flap 22 of the accessory cover 16 can include at least two notches 30. Each of these notches 30 can receive at least a portion of a respective attachment leg 24 while the cover 16 is in the first position, second position, and/or is being moved between the two positions.

The flap 22 can be any of a number of general shapes, which can be dictated by the shape of the connector 12 that it protects. For example, as shown in FIGS. 1–2, the flap 22 can be substantially rectangular. Alternatively, the flap 22 can be generally circular, round, oblong, or polygonal, to name a few. The flap 22 can be substantially flat on its inward side 32 and its outward side 34. Further, in some instances, the inward side 32 of the flap 22 can include one or more protrusions to provide additional closure of the opening 14 in the communication device 10. As shown in FIG. 2, the protrusions can be a pair of rails 36 provided along the lengthwise ends of the flap 22. The rails 36 can extend substantially transversely away from the inward side 32 of the flap 22.

Also, it should be noted that the communication device 10 can be shaped to provide access for a finger or a tool so that a user can pry or otherwise disengage the cover 16 from the first position. For example, as shown in FIGS. 1–2, a dimple or recess 38 can be provided on the communication device 10. Alternatively, the cover 16 can be shaped to provide such access as well.

As noted earlier, the distal end 28 of each of the attachment legs 24 can be adapted for connection to the communication device 10. For example, the distal end 28 of the attachment legs 24 can include one or more slots (not shown). The slots can extend partially or completely through each of the attachment legs 24. These slots can lockingly receive a corresponding protrusion (not shown) on the communication device. For example, the communication device 10 can provide at least two posts (not shown) having a t- or l-shaped end (not shown). The t- or l-shaped end of the posts can be inserted into or through the slot in each of the attachment legs 24 such that each leg 24 is substantially retained on a respective post.

Preferably, the cover 16 provides a perceptible signal so as to alert a user that he or she has succeeded in bringing the cover 16 into the first position or the second position. Preferably, the signal is one of a tactile signal or an audible signal such as a snapping sound. Such signals can be the product of the material properties of the cover in response to being flexed between the first and second positions.

Figure 9:
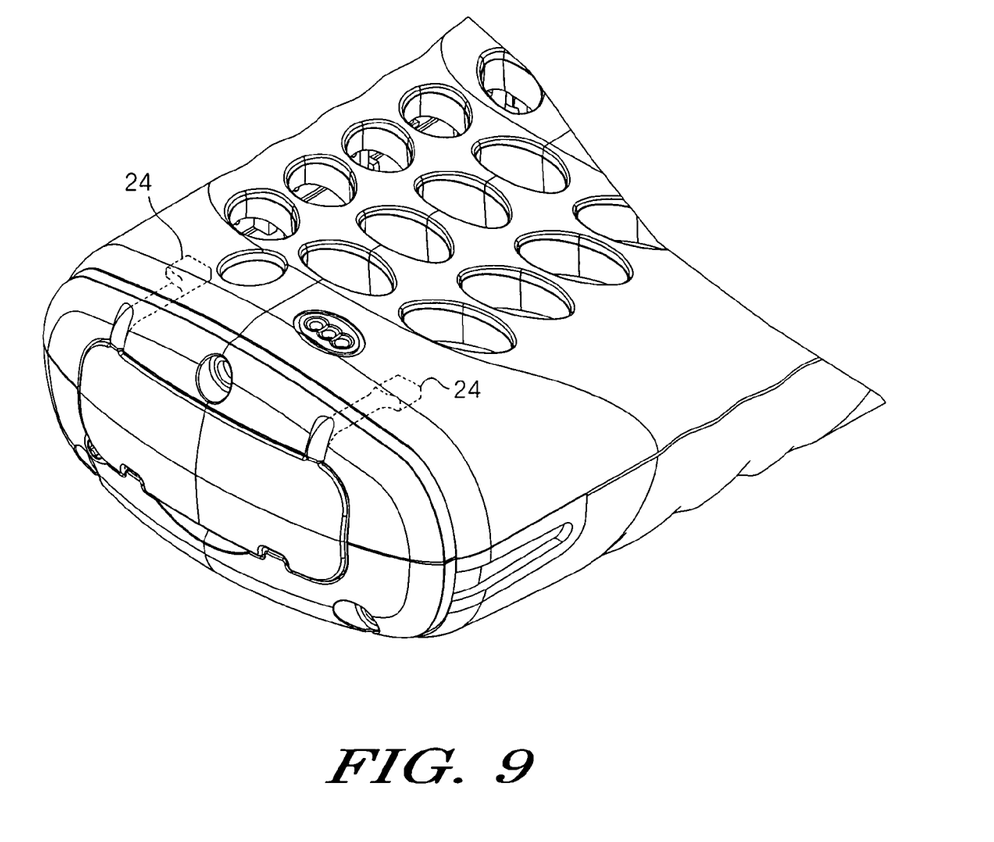
FIG. 9 shows an assembly cover in a closed position with a portion of the communication assembly removed to illustrate an attachment leg.

Another embodiment of a cover 16 according to aspects of the invention is shown in FIGS. 3–9. Again, the cover generally has a flap 22 and at least one attachment leg 24. As shown in FIG. 3, the flap 22 can be curved or can be contoured in any of a number of ways. When in the second position, the flap 22 can be disposed substantially in the same plane relative to the attachment legs 24. When in the first position, the flap 22 can be disposed substantially at 90 degrees relative to the attachment legs 24. This feature is illustrated in FIG. 9, where the attachment legs 24 are illustrated with a dashed outline.

The distal end 28 of each leg 24 can be adapted for connection to the communication device 10. For instance, the distal end 28 of the attachment legs 24 can include one or more protrusions 40. The one or more protrusions 40 can extend substantially transversely away from the rest of the attachment leg 24. The one or more protrusions 40 can be lockingly received in a corresponding passage (not shown) in the communication device 10. The corresponding passage can be a hole, recess, groove, notch or channel, to name a few.

The cover 16 can include at least one projection 42 that extends substantially transversely away from the flap 22. The at least one projection 42 can be shaped to interface with a connector 12 provided on the communication device 10. For example, the at least one projection 42 can be shaped to substantially surroundingly receive the connector 12. Alternatively, the at least one projection 42 can be shaped to be at least partially received within the connector 12.

Figure 5:
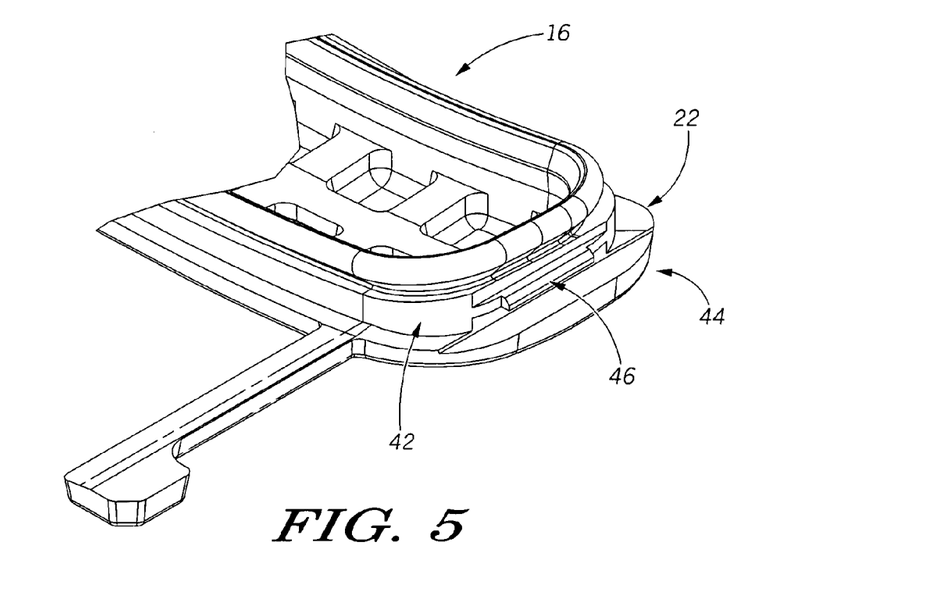
FIG. 5 is an isometric view of an edge portion of the accessory cover of FIG. 3, showing a protrusion for lockingly engaging with a portion of a communication device so as to retain the accessory cover in the first position.
Figure 6:
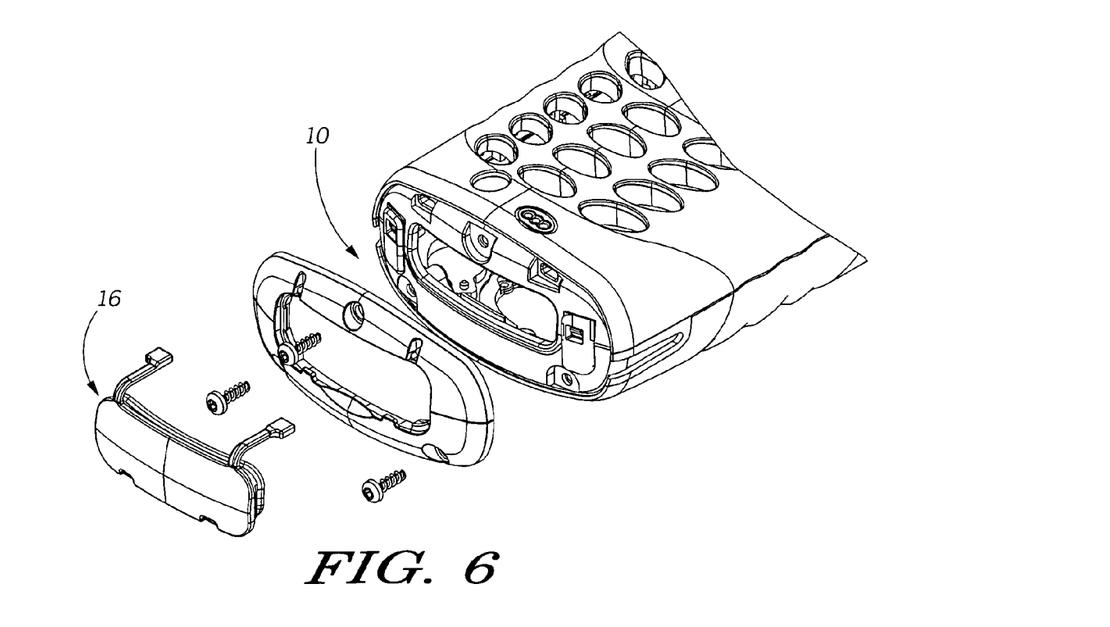
FIG. 6 is an isometric exploded view of a communication assembly according to an embodiment of the invention.
Figure 7:
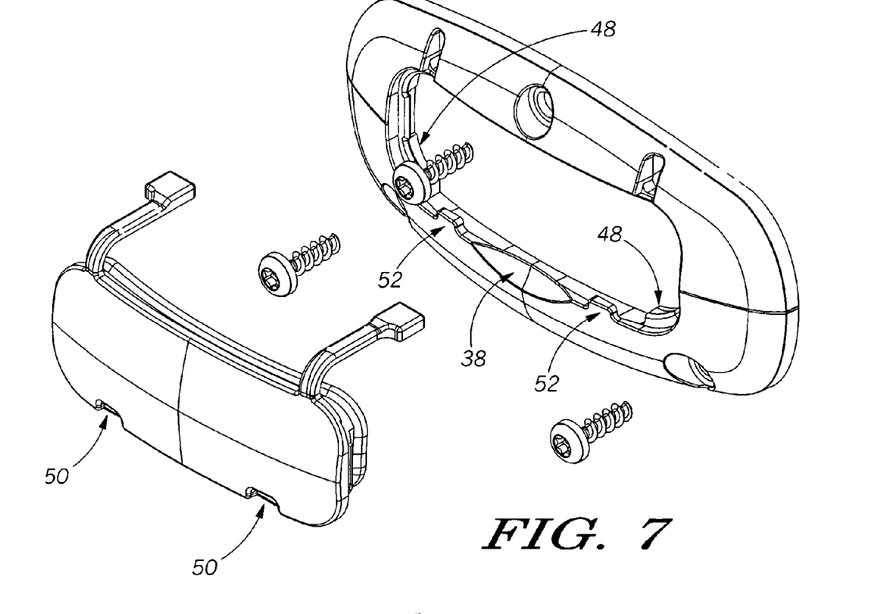
FIG. 7 is a close-up view of a portion of the communication assembly of FIG. 6.
Figure 8:
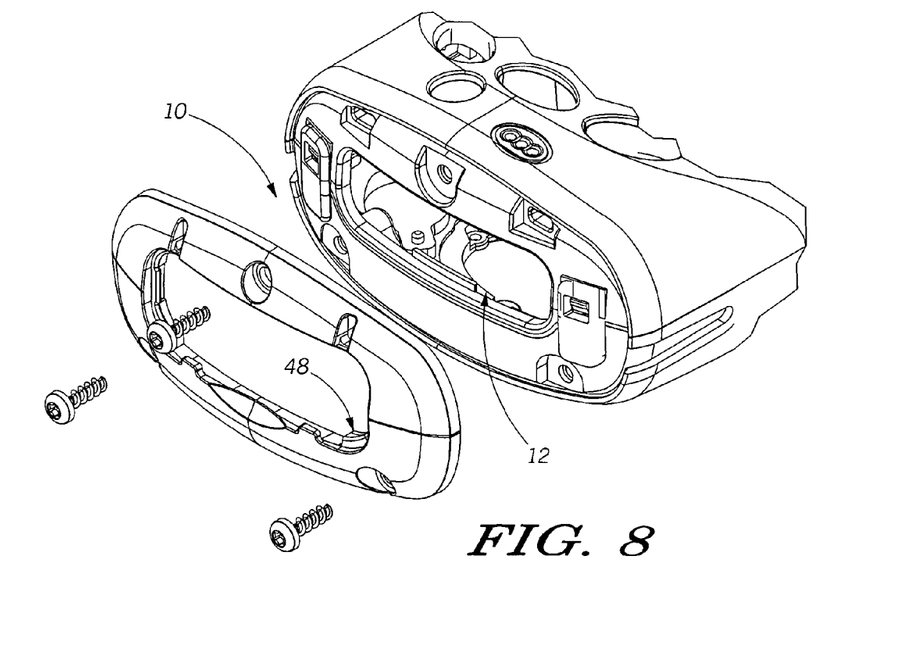
FIG. 8 is another close-up view of a portion of the communication assembly.

A cover 16 according to one embodiment of the invention can include several features for securing the flap 22 in the first position. As shown in FIG. 5, the flap 22 can include at least one edge portion 44. The edge portion 44 can include at least one protrusion 46, wherein the at least one protrusion 46 lockingly engages a portion of the communication device 10 so as to retain the communication device 10 in the first position. As shown in FIG. 7, the communication device 10 can provide a projection 48 for engaging the protrusion 46 on the edge 44 of the flap 22.

In addition, the flap 22 can also include at least one notch 50 or recess, as shown in FIG. 7. The at least one notch 50 can lockingly engage a respective protrusion such as a tab 52 (FIG. 7) or hook on the communication device 10 so as to retain the communication device 10 in the first position.

Again, the embodiments of the invention shown in FIGS. 1–9 are merely non-exhaustive examples of accessory covers that are embraced within the scope of the invention. Aspects of the invention are not limited to these embodiments; other accessory covers can fall within the scope of the invention. Further, the features described in connection with the embodiment disclosed in connection with FIGS. 1–2 can be applied in any combination with the features disclosed in connection with the embodiment shown in FIGS. 3–9. Similarly, the features described in connection with the embodiment disclosed in connection with FIGS. 3–9 can be applied in any combination with the features disclosed in connection with the embodiment shown in FIGS. 1–2.

A cover 16 as described herein can be made of a variety of materials. Preferably, the cover 16 is made from pliant material that also has creep resistant properties. For example, the cover 16 can be made from silicone rubber, polyurethane or Texin 245. The cover can be made by any of a number of methods including injection and compression molding. The cover 16 is preferably a single piece, but it can be made from two or more parts. The cover 16 can be installed at various stages during and after the assembly of the communication device 10. In some instances, the cover 16 can be configured so that it can be added to preexisting communication devices 10 such as a retrofit package.

When a communication device 10 includes any of the previously discussed connector covers 16, aspects of the invention can further relate to a method of accessing and protecting a connector 12 on a communication device 10. The method described herein is only one example. Not every step described must occur and additional steps may be performed as well. Moreover, aspects of the invention are not limited to any particular sequence in which the steps must occur.

First, a communication device 10 is provided. The communication device 10 can include at least one connector 12, an opening 14 providing access to the at least one connector 12, and a cover 16 tethered to the communication device 10. The cover 16 can be movable between at least a first locked position and a second locked position. Locked position means that the cover 16 can be held in one of the first position or the second position, in any of the manners previously discussed, such that the cover 16 is substantially prevented from traveling toward the other position. In other words, when the cover 16 is in the first locked position, the cover 16 is substantially prevented from moving toward the second position. Alternatively, when the cover 16 is in the second locked position, the cover 16 can be substantially prevented from moving toward the first locked position. In either case, it is preferred if the cover 16 is substantially prevented from traveling to the opposite position at least out of the resilience of the cover 16.

In the first locked position, at least a portion of the cover 16 can engage at least a portion of the communication device 10 so as to substantially close the opening 14 in the communication device 10. Thus, access to the connector 12 is substantially restricted. In the second locked position, substantially unimpeded access to the connector is provided.

When the cover 16 is in the first position, the cover 16 can be disengaged from the communication device 10. A user can disengage the cover 16 by using a finger or a tool. Once disengaged, the cover 16 can be moved toward the second locked position until the cover 16 locks in place away from the communication device 10 so as to provide substantially unimpeded access to the connector 12. Then, an accessory device (not shown) can be provided. The accessory device can have a connector (not shown) adapted to matingly engage the connector 12 on the communication device 10. Thus, the connector on the accessory device can be operationally joined with the connector 12 on the communication device 10.

When the user wishes to return the cover 16 to the closed first position, the user can move the cover 16 toward first locked position until at least a portion of the cover 16 engages at least a portion of the communication device 10. Multiple examples of the ways in which the engagement can occur are discussed above, but, regardless of the particular manner of engagement, the cover 16 is substantially prevented from traveling toward the second position.

While aspects of the invention have been described and/or illustrated in connection with a cellular telephone, aspects of the invention can be applied to any of a number of devices. Communication devices in this respect should thus be interpreted quite broadly as any electronic device having a connection port. It should be further noted that the various features associated with the cover and communication device are provided as nonexhaustive examples. Thus, it will of course be understood that the invention is not limited to the specific details described herein, which are given by way of example only, and that various modifications and alterations are possible within the scope of the invention as defined in the following claims.

What is claimed is:

1. An accessory cover for a communications device having a connector, comprising:
    a flap that selectively covers the connector; and
    at least two attachment legs, each leg having a proximal end and a distal end, the proximal end of each leg being flexibly connected to the flap, the distal end of each leg being adapted for connection to the communication device, at least a portion of the attachment leg being bendable,
    wherein the flap is movable between at least a closed position and an open position, wherein in the open position, the flap allows the connector to receive an accessory that the connector is designed to receive and wherein the flap remains in the open position irrespective of the positioning of the accessory cover or the communication device, wherein the two attachment legs are substantially parallel.

2. The accessory cover of claim 1 wherein, in the closed position, the flap is disposed substantially 90 degrees relative to the attachment legs.

3. The accessory cover of claim 1 wherein the cover provides one of a tactile signal or an audible signal when the cover is moved between the closed and open positions.

4. The accessory cover of claim 1 wherein the flap includes at least two notches, each of the notches receiving at least a portion of a respective attachment leg when the cover is moved.

5. The accessory cover of claim 1 wherein the at least one attachment leg includes two substantially parallel attachment legs.

6. The accessory cover of claim 1 wherein the flap is substantially flat.

7. The accessory cover of claim 1 wherein the flap is substantially rectangular.

8. The accessory cover of claim 1 wherein the distal end of the at least one attachment leg includes one or more slots, whereby the slots lockingly receive a corresponding protrusion on the communication device.

9. The accessory cover of claim 1, wherein, in the open position, the flap is disposed substantially in the same plane relative to the attachment legs.

10. The accessory cover of claim 1 wherein the distal end of the at least one attachment leg includes one or more protrusions, whereby the one or more protrusions are lockingly received in a corresponding passage on the communication device.

11. The accessory cover of claim 1 wherein at least one projection extends substantially transversely from the flap, the at least one projection shaped to interface with the connector.

12. The accessory cover of claim 11 wherein the at least one projection is shaped to substantially surroundingly receive the connector.

13. The accessory cover of claim 1 wherein the flap includes at least one edge portion, the edge portion including at least one protrusion, wherein the at least one protrusion lockingly engages a portion of the communication device so as to retain the communication device in the closed position.

14. The accessory cover of claim 1 wherein the flap includes at least one notch, wherein the at least one notch lockingly engages a respective protrusion on the communication device so as to retain the communication device in the closed position.

* * * * *